(12) United States Patent
Brown et al.

(10) Patent No.: US 11,454,430 B2
(45) Date of Patent: *Sep. 27, 2022

(54) DC SYSTEM CONTROLS

(71) Applicant: SolarXWorks, LLC, Moses Lake, WA (US)

(72) Inventors: Scott Brown, Moses Lake, WA (US); Blake Barthelmess, Moses Lake, WA (US); Tor Hartmann, Moses Lake, WA (US); Donald McGraw, Portland, OR (US)

(73) Assignee: SolarXWorks, LLC, Moses Lake, WA (US)

( * ) Notice: Subject to any disclaimer, the term of this patent is extended or adjusted under 35 U.S.C. 154(b) by 347 days.

This patent is subject to a terminal disclaimer.

(21) Appl. No.: 15/930,372

(22) Filed: May 12, 2020

(65) Prior Publication Data

US 2020/0340716 A1 Oct. 29, 2020

Related U.S. Application Data

(63) Continuation of application No. 15/786,444, filed on Oct. 17, 2017, now Pat. No. 10,648,711.

(60) Provisional application No. 62/409,138, filed on Oct. 17, 2016.

(51) Int. Cl.
*F25B 27/00* (2006.01)
*F25B 49/02* (2006.01)
*F25B 25/00* (2006.01)
*G05F 1/67* (2006.01)

(52) U.S. Cl.
CPC .......... *F25B 27/005* (2013.01); *F25B 25/005* (2013.01); *F25B 27/00* (2013.01); *F25B 49/02* (2013.01); *F25B 49/025* (2013.01); *F25B 2600/0251* (2013.01); *F25B 2600/0253* (2013.01); *F25B 2700/15* (2013.01); *F25B 2700/2104* (2013.01); *G05F 1/67* (2013.01); *Y02B 30/70* (2013.01); *Y10S 323/906* (2013.01)

(58) Field of Classification Search
CPC ........ F25B 27/00; F25B 2700/15; G05F 1/67; Y02B 30/70; Y10S 323/906
See application file for complete search history.

(56) References Cited

U.S. PATENT DOCUMENTS

2015/0349692 A1* 12/2015 Shibata ...................... H02J 7/35
    318/479
2016/0245571 A1* 8/2016 Shinomoto ......... H02M 7/5387

* cited by examiner

*Primary Examiner* — Henry T Crenshaw
(74) *Attorney, Agent, or Firm* — Kolitch Romano LLP

(57) ABSTRACT

A DC-powered system may include controls configured to switch between available DC power supplies and manage the refrigeration system in accordance with one or more methods. The one or more methods of the control system may include multiple tiers of power management, including, e.g., maximization of power usage when on a photovoltaic power supply to subcool a refrigerated load.

20 Claims, 11 Drawing Sheets

TIER THREE

TIER FOUR

DC SYSTEM CONTROLS

FIELD

This disclosure relates to power management systems and methods for direct current-powered systems.

INTRODUCTION

Refrigeration systems are used across industries, for air conditioning, cooling, refrigeration, and freezing. In some examples, direct current (DC) electricity may be used to power these systems. This may be useful, for example, in situations where battery or solar power are available. A reliable and power efficient control system is needed to manage the various aspects of these systems.

SUMMARY

The present disclosure provides systems, apparatuses, and methods relating to power management in DC-powered systems (e.g., refrigeration systems).

Features, functions, and advantages may be achieved independently in various embodiments of the present disclosure, or may be combined in yet other embodiments, further details of which can be seen with reference to the following description and drawings.

DESCRIPTION

Figure 1:
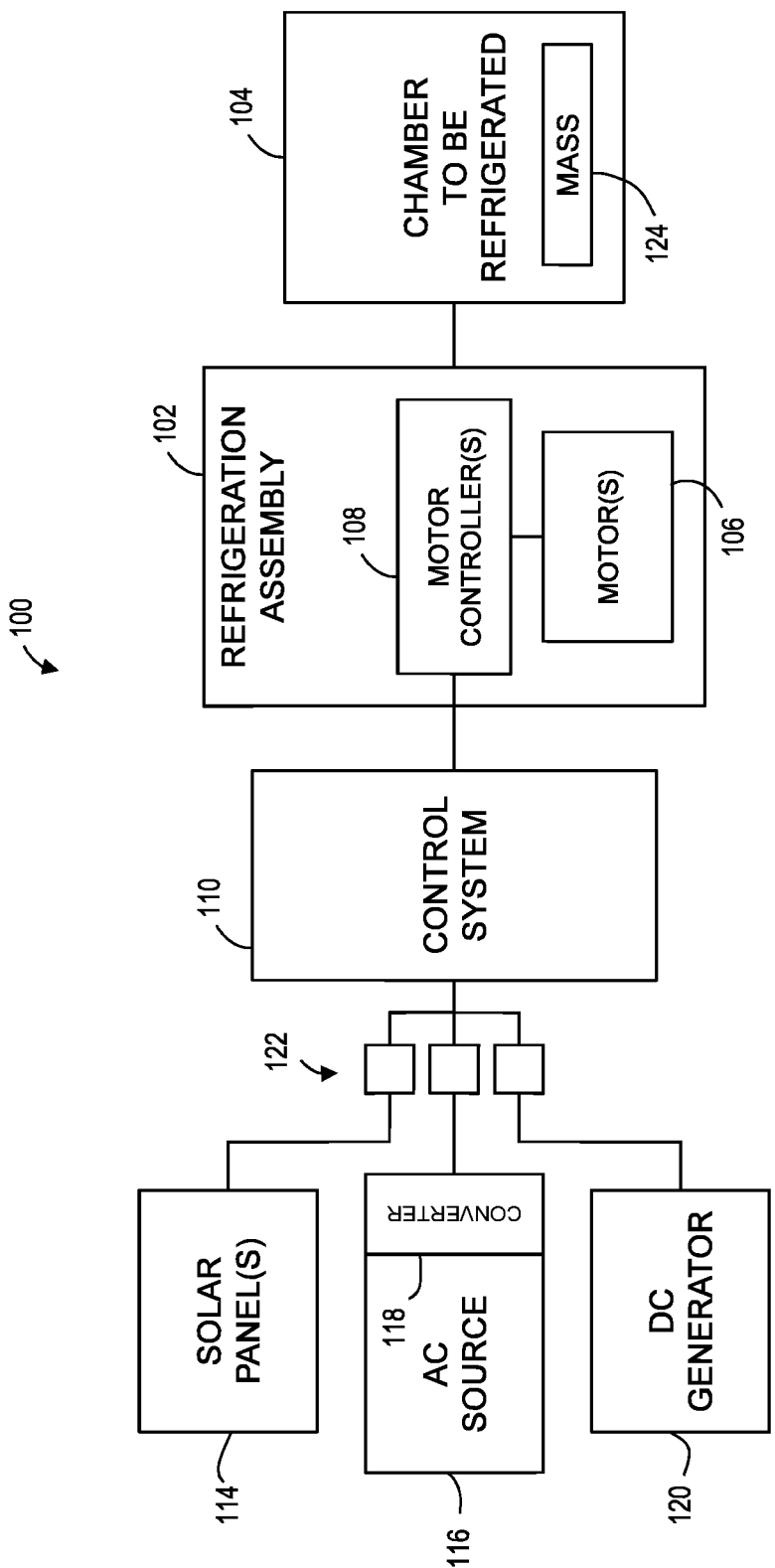
FIG. 1 is a schematic diagram showing an illustrative DC powered refrigeration system in accordance with aspects of the present disclosure.

Various aspects and examples of a control system for direct current (DC) refrigeration systems, as well as related methods, are described below and illustrated in the associated drawings. Unless otherwise specified, a control system according to the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components, and is not necessarily limited to physical connection(s).

Overview

In general, a control system according to the present disclosure includes logic-based controls configured to automatically operate a DC refrigeration system in accordance with new modes of operation. Among other things, rather than always minimizing or efficiently using available electrical power, the described control systems instead operate to maximize consumption of electrical power during certain conditions, e.g., when photovoltaic (PV) power is available. This effectively stores the extra available energy by continuing to cool mass below its freezing point, i.e., generating subcooled liquid(s) and/or solid(s). Because the cooled mass is then significantly colder than when using typical methods, this technique also causes the subcooled liquid(s) and/or solid(s) to remain frozen or otherwise below a certain temperature for a longer period of time after freely available electrical power goes away (e.g., at night, with respect to PV power). To some extent, the subcooled mass can also be used to cool other objects, if needed, without additional power usage.

The control system may sense system voltage and switch between various power supplies based on predetermined algorithms. In some examples, the control system may manage the cycling or on/off state of one or more motors of the refrigeration system. In some examples, the control system may adjust speeds and/or rates of change of speeds of the one or more motors. In some examples, the control system may be operable in a plurality of modes, each mode configured with different temperature-based actions to reduce or otherwise manage power consumption by the motor(s).

With reference to FIG. 1, a refrigeration system 100 according to the present teachings includes a refrigeration assembly 102 (also referred to as a refrigeration unit) operatively connectable to a chamber 104 to be refrigerated. Refrigeration assembly 102 may include any suitable devices and structures forming a closed circuit configured to compress, condense, expand, and evaporate a refrigerant fluid in a refrigeration cycle, such that heat is removed from chamber 104 for purposes of air conditioning, refrigeration, and/or freezing. In the examples described herein, refrigeration assembly 102 may be configured to run entirely on direct current (DC) power. Accordingly, refrigeration assembly 102 may include one or more DC motors 106, each of which may be controlled by a corresponding motor controller 108.

System 100 further includes a control system 110 configured to automatically control power being supplied to assembly 102, and to automatically control components of assembly 102, such as motors 106 through their controllers 108, in accordance with a desired (e.g., efficient and reliable) operation of the system. Control system 110 may include any suitable control circuitry, software, firmware, hardware, or the like, or any combination of these, configured to control aspects of system 100 dynamically, based on predetermined algorithms and/or settings. For example, control system 110 may comprise a programmable logic controller (PLC), as further described below.

Control system 110 may be configured to automatically select from one or more power sources 112, depending on sensed characteristics. Power sources 112 may include, for example, one or more solar panels or photovoltaic (PV) cells 114, an alternating current (AC) source 116 capable of supplying DC power through an AC to DC converter 118, and/or one or more DC generator(s) 120. Other power sources may be available in addition to or instead of those just described, such as a stored power source (e.g., a backup battery). DC voltage outputs of each power source 112 may be set and controlled using a set of voltage controllers 122. In some examples, more or fewer power sources 112 may be available. For example, only PV cells 114 may be available, such as in an "off the grid" arrangement.

A function of refrigeration assembly 102 and control system 110 is to cool chamber 104 and, subsequently, a mass 124 contained therein. As described above, mass 124 may include solid(s) and/or liquid(s), or any combination of these, such as stored consumer products (e.g., food), electronic hardware, human inhabitants, portions of chamber 104 itself, the atmosphere of chamber 104, a dummy load, etc. In some examples, mass 124 may constitute a functional part of system 100, e.g., when mass 124 is subcooled to take advantage of available PV energy, effectively "storing" the energy as a reduction of the thermal energy in mass 124. In other words, mass 124 represents a portion of system 100 that may function as a "cold sink" (i.e., heat source) when excess electrical energy is available, for later use as a "cold source" (i.e., heat sink) when energy for cooling is less available.

Accordingly, aspects of DC refrigeration control systems as described herein may be embodied as a computer method, computer system, or computer program product. Aspects of the control systems may take the form of an entirely hardware embodiment, an entirely software embodiment (including firmware, resident software, micro-code, and the like), or an embodiment combining software and hardware aspects, all of which may generally be referred to herein as an "electrical or electronic circuit," a "module," or a "system." Furthermore, aspects of the control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the control systems may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary control systems and refrigeration-related devices, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Refrigeration Systems

As shown in FIGS. 2-6, this section describes a control system 236 for a DC refrigeration system 200, as well as selected embodiments of system 200 (e.g., indicated at 300, 350, and 370). Systems 236 and 200 are examples of systems 110 and 100, respectively, described above. Accordingly, similar components may be labeled with similar reference numbers.

Figure 2:
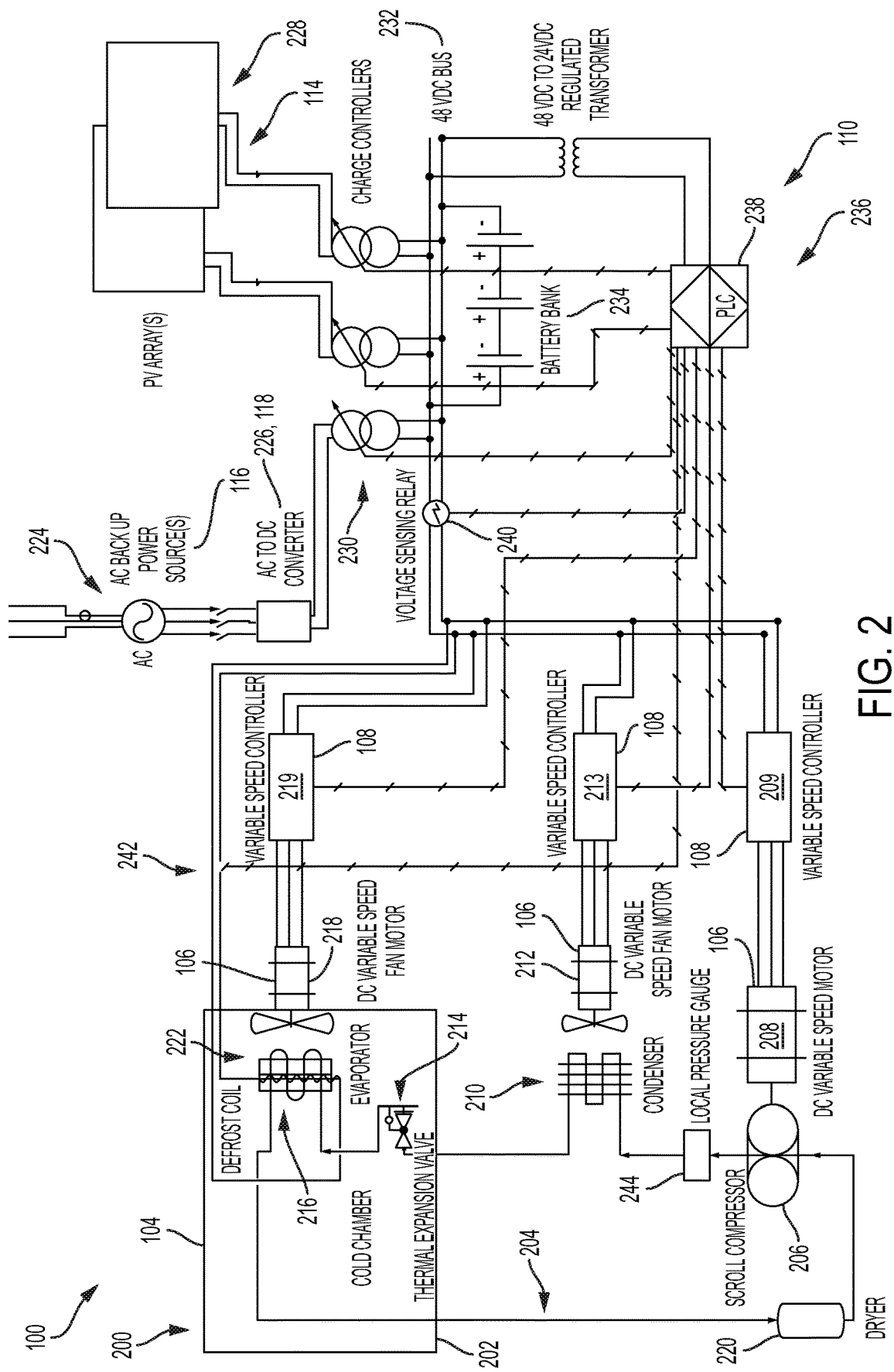
FIG. 2 is a schematic circuit diagram showing an illustrative DC powered refrigeration system and related controls.

FIG. 2 is a schematic diagram of DC refrigeration system 200 and control system 236. DC refrigeration system 200 includes a chamber 202, which is cooled by the system, and a refrigeration unit comprising a refrigeration circuit 204. In this case, circuit 204 is a circuit in the sense of forming a closed loop, rather than an electrical circuit. The refrigeration circuit includes a compressor 206 (e.g., a DC scroll compressor) for compressing and transporting the refrigerant. Compressor 206 includes a DC motor 208 controlled by a motor controller 209 (e.g., a variable frequency drive (VFD)). After passing through (or past) a pressure gauge 244, the high pressure gas refrigerant is condensed into a high pressure liquid in condenser 210. Coils of condenser 210 transfer heat to the ambient air, and therefore the condenser is accompanied by a fan having a DC variable speed fan motor 212. Motor 212 is controlled by a motor controller 213 (e.g., a VFD).

Circuit 204 next includes an expansion valve 214 inside chamber 202, which causes the high pressure liquid refrigerant to become a low pressure liquid. This low pressure liquid refrigerant is then heated by the chamber atmosphere, to become a low pressure gas, in an evaporator 216. In this process, heat is transferred from the chamber atmosphere to the refrigerant, thereby cooling the chamber. As with the condenser coils, the evaporator is accompanied by a fan having a DC variable speed fan motor 218 controlled by a motor controller 219 (e.g., a VFD). The low pressure gas is then transported out of the chamber and to the compressor through a dryer 220 to again cycle through the circuit.

In such systems, frost and ice may build up on evaporator 216, thereby reducing its effectiveness at heat transfer. Accordingly, a defrost coil 222 interfaces with evaporator 216, such that the defrost coil can be selectively used to melt any frost or ice on the evaporator coils.

Electrical power, in the form of DC voltage (e.g., 48 VDC), is provided to these various components from a selectable one of a plurality of sources. For example, an AC voltage source 224 (e.g., standard electrical grid power, AC generator power, etc.) may be passed through an AC to DC converter 226 to provide DC voltage. Alternatively, DC power may be provided by one or more (e.g., an array of) photovoltaic cells 228 (also referred to as PV panels). Power sources may be selected from, using voltage controllers 230. The controllers connect the voltage source(s) to a DC power bus 232, which in turn powers the motors and defrost coil. A storage battery 234 is also electrically connected to bus 232, and may be used to store excess power and/or provide backup power in the event no other sources are available.

The following is an example of how such a system may operate. PV panels 228 may produce power in excess of the load, such that voltage will rise to a maximum set point of approximately 54V (e.g., 54.6 VDC). As less sunlight is available, the voltage will drop. When voltage reaches approximately 47 Volts, the supply automatically switches to the AC back up power (i.e., through converter 226). This automatically raises the operating voltage, e.g., to 50V. If sunlight becomes available, and the PV panels produce more than the 50V, the supply will automatically shift the load back to the PV panels. A delay timer may be used to ensure that the system does not rapidly cycle between two power sources. If voltage drops below the low point of the AC backup power supply, a diesel generator may auto-start, raising the voltage to 48V. If AC power becomes available, the system voltage again raises to 50V, and the diesel generator shuts off, transferring the load back to the AC supply. AC supply 224 may be isolated using a relay, to prevent it from becoming a load on the PV panels. Further details of such a system are described below with respect to FIG. 7.

Control system 236 may include any suitable control devices and software configured to manage and automatically adjust system 200 based on programmed instructions. In this example, control system 236 includes a PLC 238 (see Section D) in communication with a voltage sensor 240 on bus 232 as well as with voltage controllers 230 and motor controllers 209, 213, and 219. The control system may also be in communication with a switch 242 for selectively connecting the defrost coils to power bus 232. In general, PLC 238 may be programmed to execute one or more algorithms to automatically control (a) which power source (s) are connected to bus 232 and/or (b) one or more parameters of the motor controllers, to ensure efficient and proper operation of system 200. As explained above, in some modes, efficiency may be based on overall system efficiency rather than on short-term minimization of electrical power usage. Specific examples of algorithms are described in further detail in the next section. Control system 236 may be powered from bus 232 (e.g., through a transformer), as depicted in FIG. 2.

Figure 3:
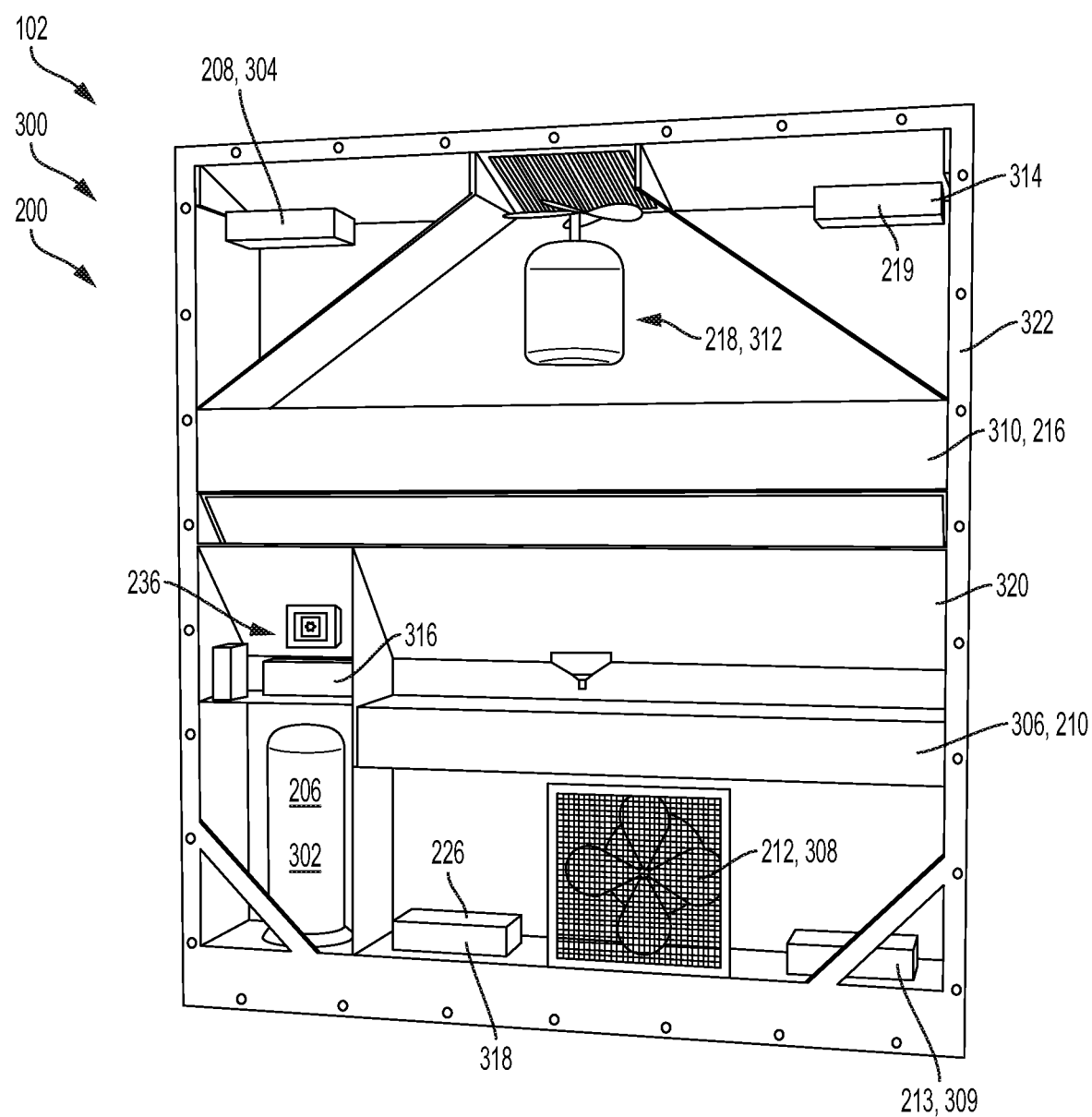
FIG. 3 is a first oblique perspective view of an illustrative DC powered refrigeration assembly in accordance with aspects of the present disclosure.
Figure 4:
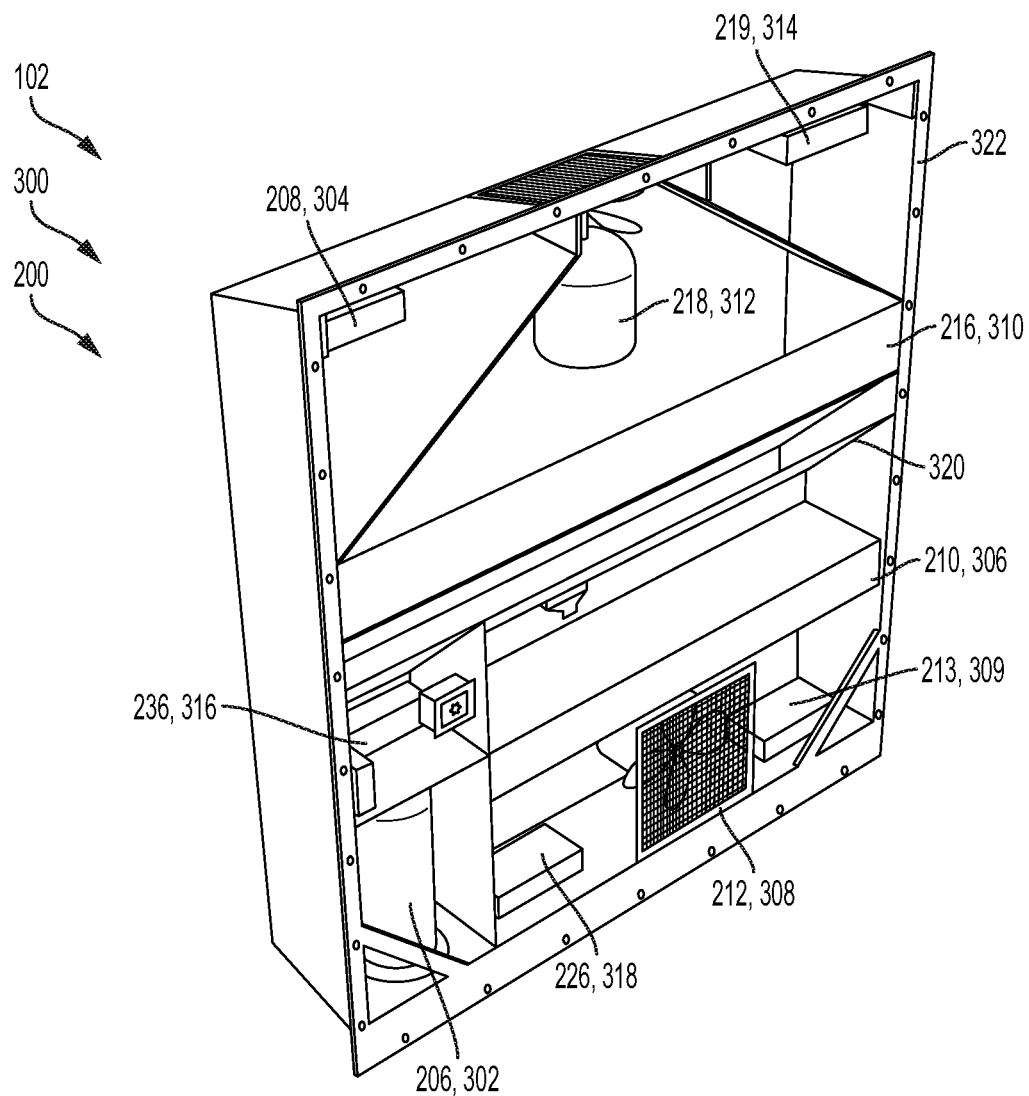
FIG. 4 is a second oblique perspective view of the DC powered refrigeration assembly of FIG. 3.

Turning to FIGS. 3-4, an illustrative embodiment of refrigeration assembly 102 is shown and generally indicated at 300. Refrigeration assembly (or unit) 300 includes examples of the components of system 200, as described above. Specifically, assembly 300 may include a scroll compressor 302 having a controlling VFD 304, a condenser 306 and accompanying fan/motor 308 and VFD 309, and an evaporator 310 and fan/motor 312 with VFD 314. Controls 316 are included, which are configured to control VFDs 304, 309, and 310, as well as a selectable power supply, which may be provided through an AC to DC converter 318. Piping, plumbing, etc., containing the refrigerant and connecting the various components is not depicted in FIGS. 3-4.

Figure 5:
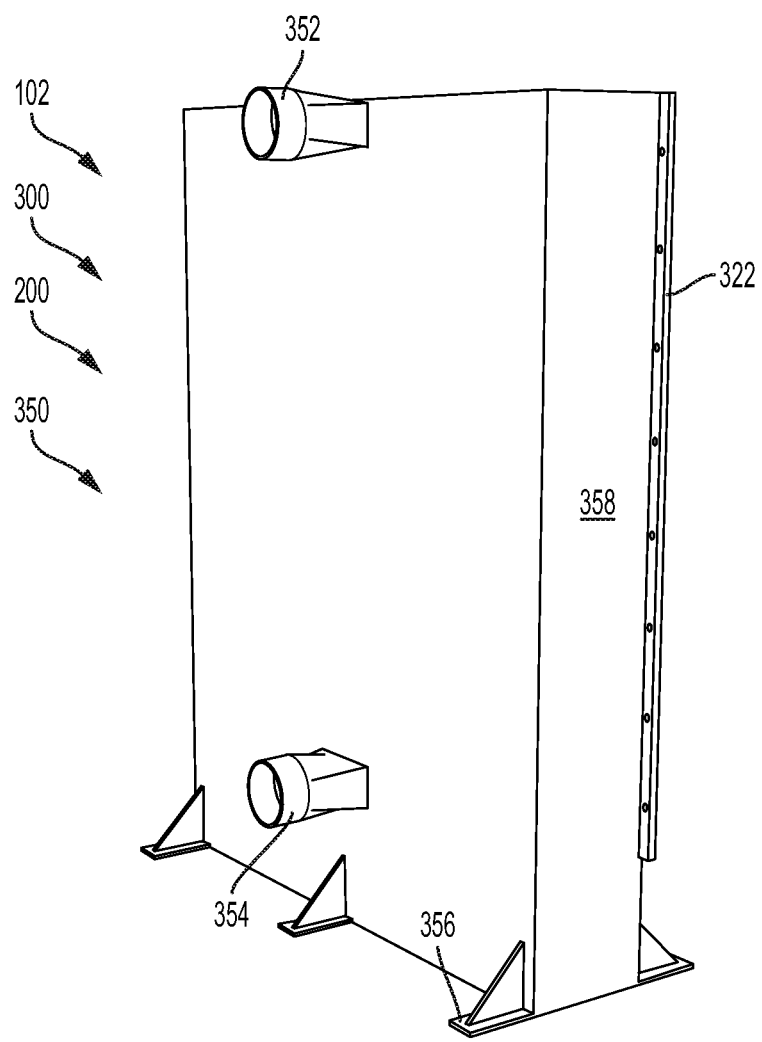
FIG. 5 is an oblique perspective view of an illustrative modular DC powered refrigeration assembly.
Figure 6:
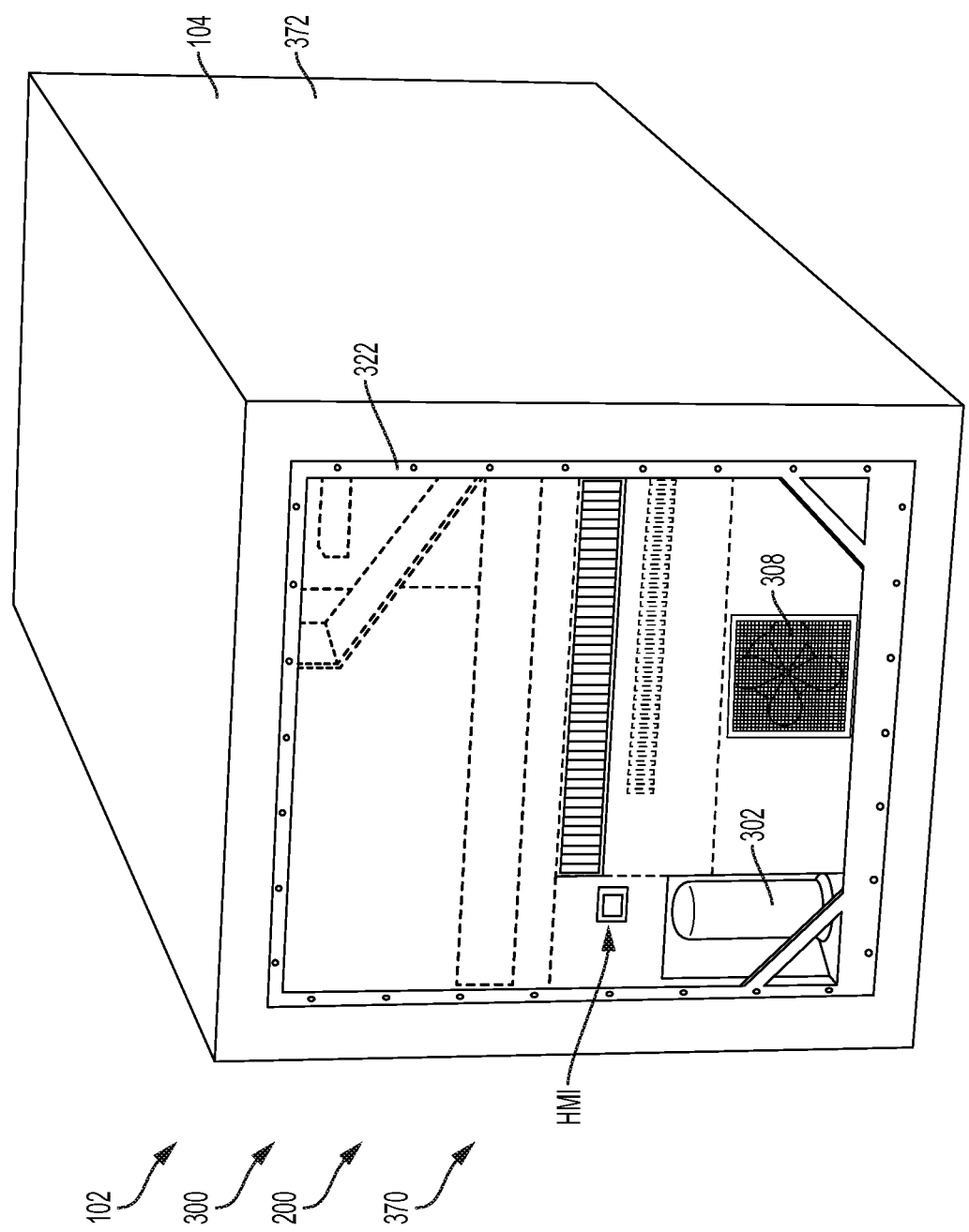
FIG. 6 is an oblique perspective view of an illustrative DC powered refrigeration assembly integrated with an enclosed container.

Assembly 300 includes one or more separator walls 320, which may act as thermal barriers, and is contained in a housing 322. Housing 322 facilitates the modular nature of assembly 300, which is further illustrated in the exemplary applications depicted in FIGS. 5 and 6. For example, FIG. 5 shows a modular, standalone unit 350, which incorporates assembly 300 into an enclosed cabinet 358 standing on feet 356. Unit 350 includes an outlet 352 and inlet 354 for operatively connecting unit 350 to a remotely located chamber (e.g., using flexible tubing). FIG. 6 shows a refrigeration unit 370 incorporated into an end wall of a container 372. Container 372 may comprise a shipping container or any other suitable chamber to be cooled by the unit. Many other suitable embodiments of refrigeration assembly 102 are possible, and the above examples are included for illustration only.

B. Illustrative Methods for Controlling a DC-Powered Refrigeration System

This section describes illustrative methods for controlling a DC-powered refrigeration system; see FIGS. 7-10. Aspects of control systems and refrigeration systems described above may be utilized in the method steps described below. Where appropriate, reference may be made to previously described components and systems that may be used in carrying out each step. These references are for illustration, and are not intended to limit the possible ways of carrying out any particular step of the method.

FIGS. 7-10 are flowcharts and diagrams illustrating steps performed in illustrative methods, and may not recite the complete process or all steps of each method. FIGS. 7-10 depicts multiple steps of a method or group of related methods, generally indicated at 400, 500, 600, and 700, which may be performed in conjunction with control systems according to aspects of the present disclosure. Although various steps of these methods are described below and depicted in FIGS. 7-10, the steps need not necessarily all be performed, and in some cases may be performed in a different order than the order shown. Furthermore, each of the depicted methods may be performed independently or in combination with one or more of the other methods, or with any other suitable control methods.

In the descriptions below, aspects of system 200 (e.g., PLC 238) are used to carry out steps of the described methods. In some examples, PLC 238 may be programmed with instructions that, when executed, perform one or more of the methods, or portions thereof. Although system 200 and PLC 238 are used to illustrate the methods, any suitable embodiment of system 100 may be utilized to carry out the methods.

Figure 7:
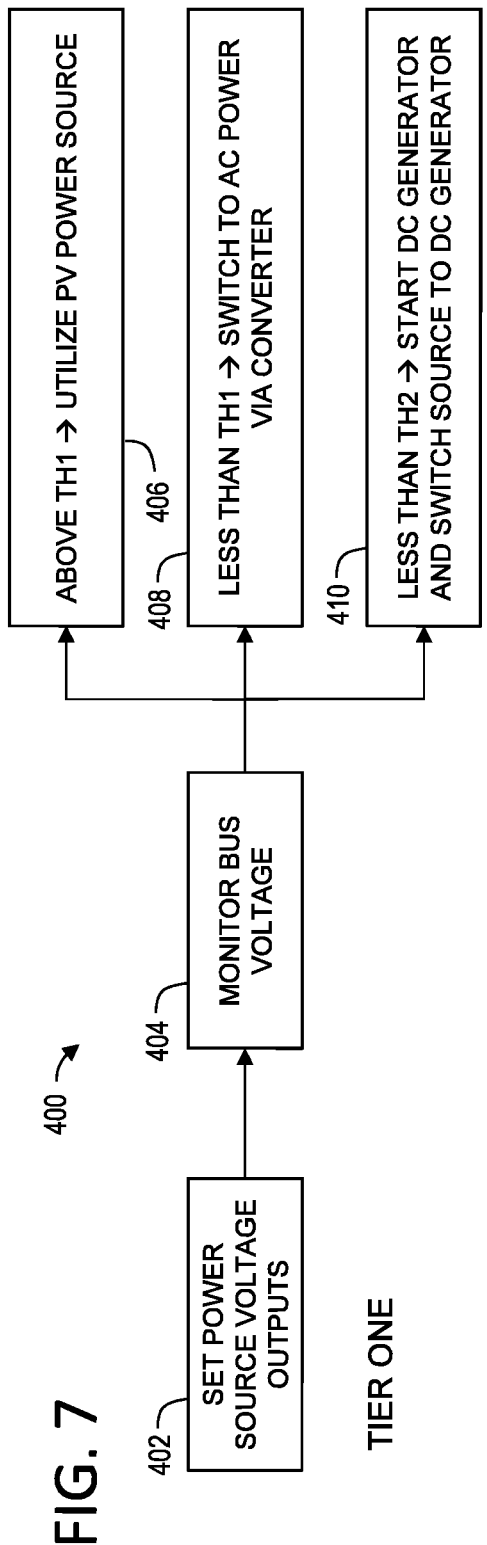
FIG. 7 is a flow chart depicting steps of a first illustrative method for controlling a DC powered refrigeration system in accordance with aspects of the present disclosure.

With reference to FIG. 7, method 400 (also referred to as first-tier or tier-one control) is described as follows (using system 200 to illustrate). Each power source (e.g., PV panel arrays 228, AC source through AC to DC converter 226, DC generator, etc.) is connected to the 48 VDC bus 232 via a voltage controller 230, as described above. Each source's output voltage may be regulated and monitored to provide automatic load distribution. Method 400 is configured to bias the refrigeration system toward consumption of PV-based power (e.g., to reduce operating costs).

Accordingly, at step 402, power source voltage outputs are set. The output voltage setpoint of the PV panel arrays will have the highest value, as compared to other sources. The other sources will be set lower, in a prioritized manner, to ensure the next desired source provides power in the absence of the preceding source (e.g., if PV power is unavailable, the system will fail elegantly to AC-based power). For example, PV arrays may be set to 54 volts, the AC to DC converter set to 51 volts, and the DC generator set to 48 volts. At step 404, the system monitors bus voltage, continuously comparing bus voltage to two thresholds (TH1 and TH2).

Thresholds may be set such that a higher, first threshold (TH1) is at approximately 51 VDC and a lower, second threshold (TH2) is at approximately 48 VDC. Other thresholds may be selected, based on expected voltages from step 402. As bus voltage dips below a threshold, or a power source's output rises above a threshold, the control system may automatically switch to (or add or remove) the next lower or higher source of power, e.g., via the voltage regulator(s).

With this arrangement, when solar power is available, the bus voltage should be 54 VDC, and system motors will be powered solely by solar power (see block 406). As solar power becomes less available and the bus voltage begins to dip below 51 VDC, the AC to DC converter may begin to pick up load and maintain the voltage at 51 VDC (see block 408). If there is no PV power available, the AC to DC converter picks up the entire load. In the event that there is no PV power available and no AC power available, the DC generator may be auto-started to maintain bus voltage at 48 VDC (see block 410). When either AC or PV power becomes available, the voltage rises to 51 volts or 54 volts respectively, thereby causing the control system to stop the DC generator. If PV power is available and voltage rises above 51 volts, the controls may switch entirely to PV power.

Figure 8:
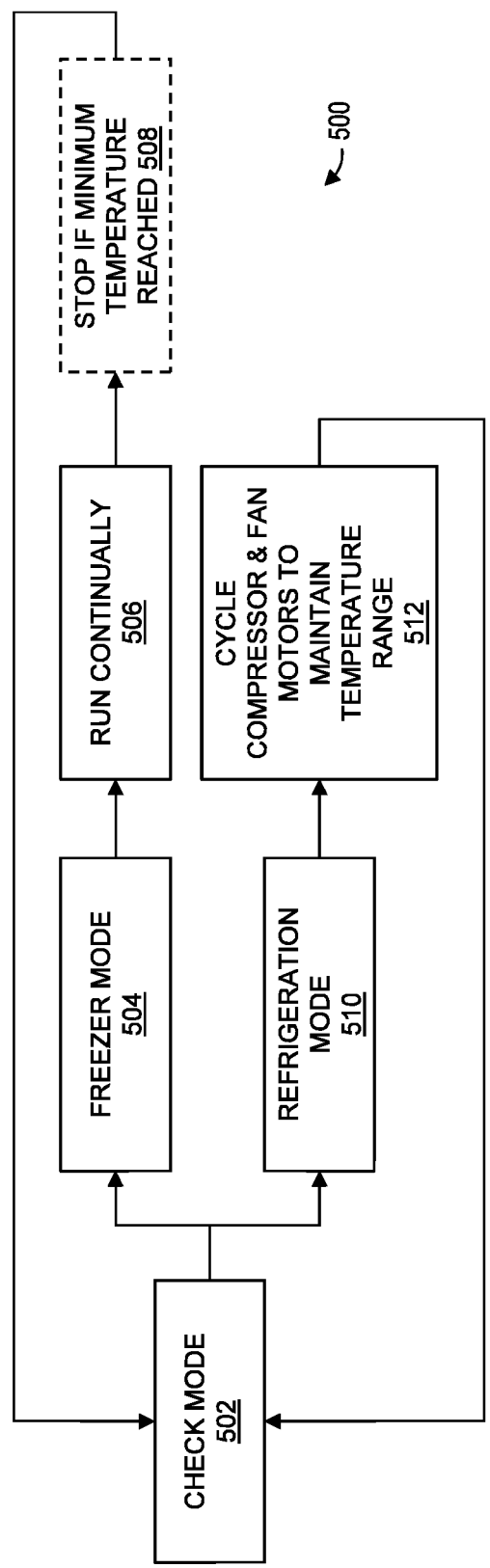
FIG. 8 is a flow chart depicting steps of a second illustrative method for controlling a DC powered refrigeration system in accordance with aspects of the present disclosure.

With reference to FIG. 8, method 500 (also referred to as second-tier or tier-two control) is described as follows. At step 502, the control system checks for different modes of operation. If in "Freezer" mode (block 504), the controls may command continuous cooling, by causing the system motors to run continually at step 506. Freezer mode may be determined by any suitable method, such as by recognizing a selected mode or determining that the system is set at a freezing temperature setpoint or range. Continuous cooling causes subcooling of mass 124, and, as described above, facilitates storage of the excess PV power as cold mass in the freezer chamber. In other words, cooling may continue beyond the point of freezing mass 124, e.g., well below 32 F. If freezer temperature control is required, this may be limited or overridden at step 508, e.g., by a setting an absolute minimum freezer temperature (e.g., 0 F or −10 F). Freezer mode may be interlocked with or otherwise dependent on aspects of tier-one controls. For example, freezer mode may have a minimum temperature limit enabled or enforced when bus voltage is less than TH1 (i.e., when not on PV power).

If in "Refrigeration" mode (block 510), the control system may cycle compressor and fan motors to maintain a desired temperature range, regardless of the power source available (block 512). Refrigeration mode may, for example, be entered any time the system is in a refrigeration or air conditioning temperature setpoint range, or whenever a corresponding mode is selected by the user. This mode may also be used to maintain a temperature range below the freezing point, e.g., when not on PV power.

Figure 9:
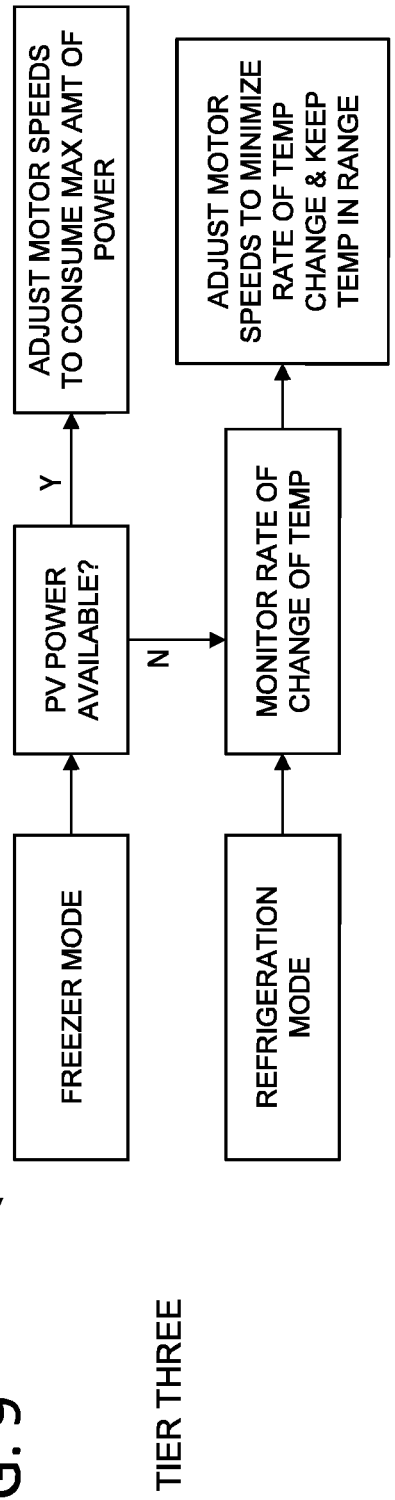
FIG. 9 is a flow chart depicting steps of a third illustrative method for controlling a DC powered refrigeration system in accordance with aspects of the present disclosure.

With reference to FIG. 9, method 600 (also referred to as third-tier or tier-three control) is described as follows. The system may adjust speeds of one or more motors of the refrigeration system, using the associated VFDs, to minimize power consumption and/or to match the amount of power required to maintain system performance. For example, when operating in the "Refrigeration" temperature range, the control system may monitor the rate of change of the temperature within the unit. The control system may automatically adjust motor speeds to minimize the rate of change, and to keep the temperature within the desired control range. Conversely, while operating in "Freezer" mode, the control system may vary the motor speeds to consume as much available PV power as possible. If PV power is not available, the control system may manage motor speed in the same manner as "Refrigeration" mode.

Figure 10:
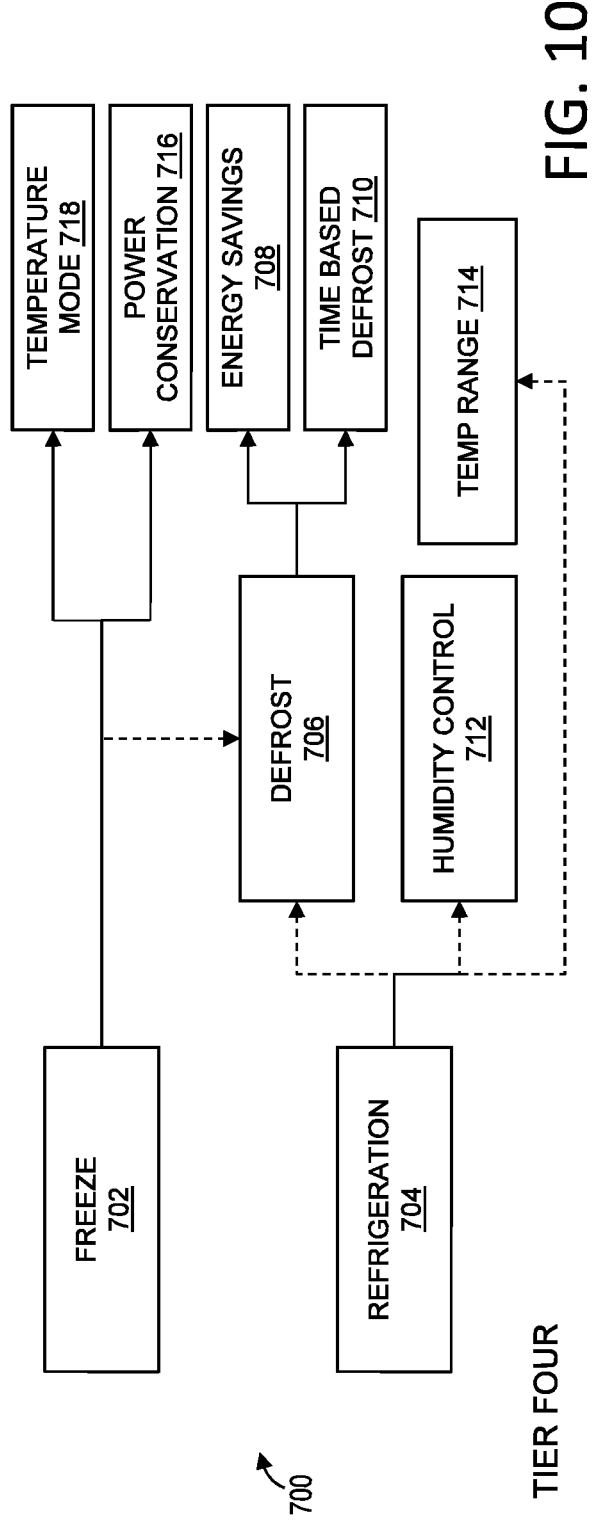
FIG. 10 is a flow chart depicting steps of a fourth illustrative method for controlling a DC powered refrigeration system in accordance with aspects of the present disclosure.

With reference to FIG. 10 (also referred to as fourth-tier or tier-four control), method 700 is described as follows. In some examples, the refrigeration system is equipped with defrost coils (e.g., coils 222) and (optionally) with humidity control equipment. The "Defrost" cycle (block 706) can run in two modes, whether in freezer mode (block 702) or in refrigeration mode (block 704): Mode 1 is an energy savings mode 708, in which the control system monitors energy consumption of the evaporator fan. When the fan is experiencing increased air flow resistance (e.g., caused by frost on the evaporator coils), the amperage drawn by the fan (sensed by the control system) will increase. The control system responds by initiating a defrost cycle. Mode 2 is a time-based defrost mode 710, in which the operator may select the frequency of the defrost cycle in terms of a time interval between cycles.

A "Humidity Control" mode 712 of method 700 may only operate when the system is in "Refrigeration" mode. To operate the humidity control equipment, a suitable water source must be provided. When humidity is low, the control system may cause the humidity equipment to add water vapor to the discharge side of the evaporator. When humidity is high, the control system may lower the evaporator fan speed, which decreases the output temperature from the evaporator, thereby condensing more water from the air.

"Refrigeration" may include a "temperature sensitive" or "temperature range" mode 714, e.g., with unit temperature setpoints of 33 F to 55 F. This mode can run concurrently with "Defrost" and/or "Humidity Control," as indicated in FIG. 10. In some examples, the width of the allowable temperature range can be adjusted by the operator, e.g., from plus or minus 1 F to plus or minus 10 F from a setpoint. The wider the range, the more energy conservation may be achieved.

In method 700, "Freeze" includes a power submode (block 716) and/or temperature sensitive submode (block 718) where unit temperature setpoints are at or below 32 F. Either sub-mode of Freeze mode may be run concurrently with "Defrost," as shown in FIG. 10. The size of the temperature range can be adjusted by the operator from plus or minus 1 F to plus or minus 10 F, as above. The wider the range, the more energy conservation. "Freeze" mode may operate in temperature submode 718, which strictly controls based on the temperature setpoint range. The "Freeze" mode can alternatively operate in power conservation mode 716, which consumes all available PV power by subcooling the mass in the unit to the temperature limit of the chosen refrigerant. Submode 716 corresponds to block 506 of method 500, and method 700 illustrates how methods 500 may be integrated with defrost and/or humidity control systems. In this example, power is conserved in the sense that it is stored for later use (e.g., as a reduction in thermal energy of mass 124).

C. Illustrative Data Processing System

Figure 11:
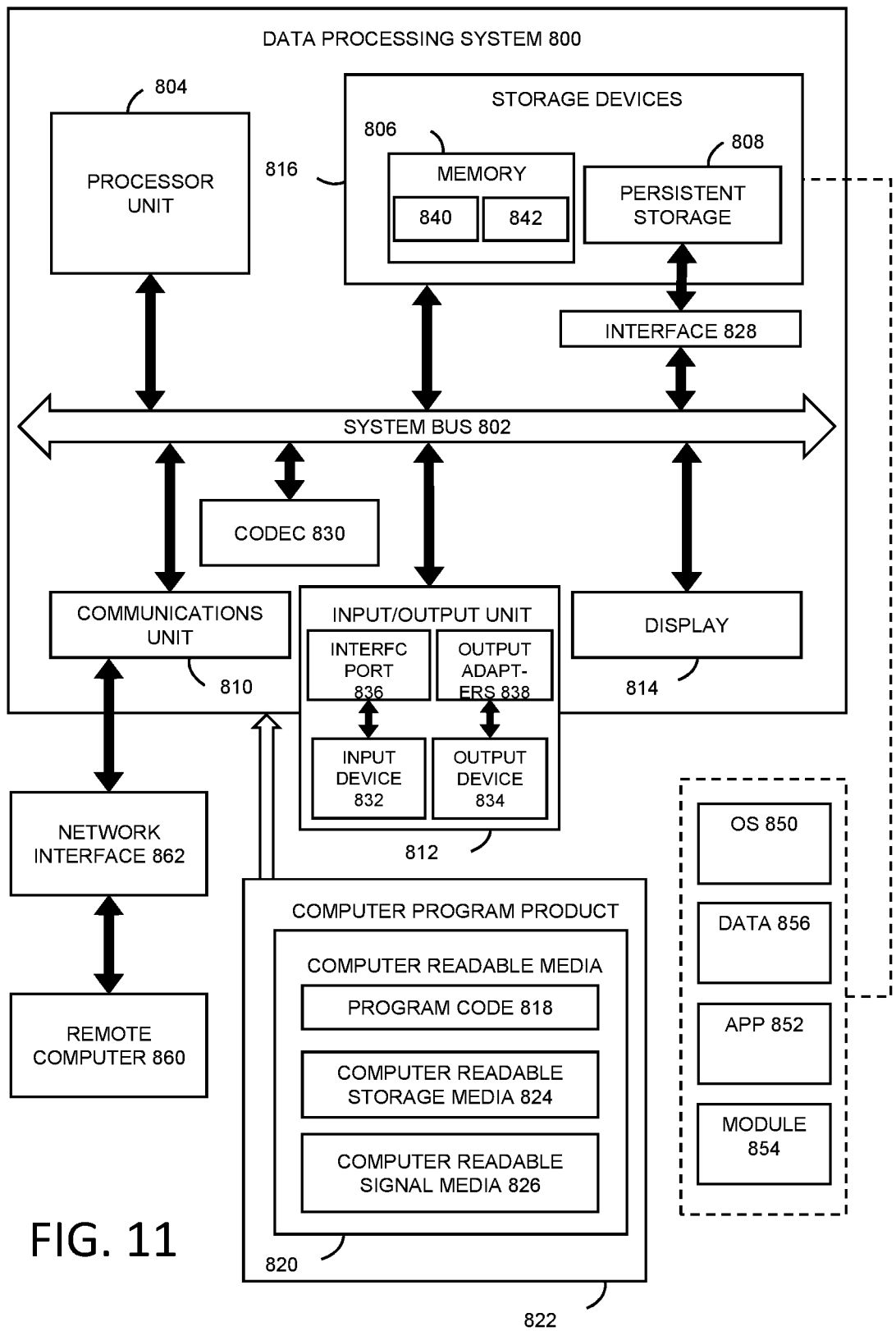
FIG. 11 is a schematic diagram of an illustrative data processing system suitable for use with refrigeration control systems in accordance with aspects of the present disclosure.

As shown in FIG. 11, this example describes a data processing system 800 (also referred to as a computer) in accordance with aspects of the present disclosure. In this example, data processing system 800 is an illustrative data processing system suitable for implementing aspects of control systems according to the present teachings. More specifically, in some examples, devices that are embodiments of data processing systems (e.g., PLC systems) may function as controllers and/or interfaces with the control system. Methods described, for example, in FIGS. 7-10 may be computer-implemented, such that examples of data processing system 800 are utilized to carry out one or more steps or operations.

In this illustrative example, data processing system 800 includes a system bus 802 (also referred to as communications framework). System bus 802 may provide communications between a processor unit 804 (also referred to as a processor or processors), a memory 806, a persistent storage 808, a communications unit 810, an input/output (I/O) unit 812, a codec 830, and/or a display 814. Memory 806, persistent storage 808, communications unit 810, input/output (I/O) unit 812, display 814, and codec 830 are examples of resources that may be accessible by processor unit 804 via system bus 802.

Processor unit 804 serves to run instructions that may be loaded into memory 806. Processor unit 804 may comprise a number of processors, a multi-processor core, and/or a particular type of processor or processors (e.g., a central processing unit (CPU), graphics processing unit (GPU), etc.), depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device may include any suitable hardware capable of storing information (e.g., digital information), such as data, program code in functional form, and/or other suitable information, either on a temporary basis or a permanent basis.

Storage devices 816 also may be referred to as computer-readable storage devices or computer-readable media. Memory 806 may include a volatile storage memory 840 and a non-volatile memory 842. In some examples, a basic input/output system (BIOS), containing the basic routines to transfer information between elements within the data processing system 800, such as during start-up, may be stored in non-volatile memory 842. Persistent storage 808 may take various forms, depending on the particular implementation.

Persistent storage 808 may contain one or more components or devices. For example, persistent storage 808 may include one or more devices such as a magnetic disk drive (also referred to as a hard disk drive or HDD), solid state disk (SSD), floppy disk drive, tape drive, Jaz drive, Zip drive, LS-80 drive, flash memory card, memory stick, and/or the like, or any combination of these. One or more of these devices may be removable and/or portable, e.g., a removable hard drive. Persistent storage 808 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 808 to system bus 802, a removable or non-removable interface is typically used, such as interface 828.

Input/output (I/O) unit 812 allows for input and output of data with other devices that may be connected to data processing system 800 (i.e., input devices and output devices). For example, input device 832 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 804 through system bus 802 via interface port(s) 836. Interface port(s) 836 may include, for example, a serial port, a parallel port, a game port, and/or a universal serial bus (USB).

Output devices 834 may use some of the same types of ports, and in some cases the same actual ports, as input device(s) 832. For example, a USB port may be used to provide input to data processing system 800 and to output information from data processing system 800 to an output device 834. Output adapter 838 is provided to illustrate that there are some output devices 834 (e.g., monitors, speakers, and printers, among others) which require special adapters. Output adapters 838 may include, e.g. video and sounds cards that provide a means of connection between the output device 834 and system bus 802. Other devices and/or systems of devices may provide both input and output capabilities, such as remote computer(s) 860. Display 814 may include any suitable human-machine interface or other mechanism configured to display information to a user, e.g., a CRT, LED, or LCD monitor or screen, etc.

Communications unit 810 refers to any suitable hardware and/or software employed to provide for communications with other data processing systems or devices. While communication unit 810 is shown inside data processing system 800, it may in some examples be at least partially external to data processing system 800. Communications unit 810 may include internal and external technologies, e.g., modems (including regular telephone grade modems, cable modems, and DSL modems), ISDN adapters, and/or wired and wireless Ethernet cards, hubs, routers, etc. Data processing system 800 may operate in a networked environment, using logical connections to one or more remote computers 860. A remote computer(s) 860 may include a personal computer (PC), a server, a router, a network PC, a workstation, a microprocessor-based appliance, a peer device, a smart phone, a tablet, another network note, and/or the like. Remote computer(s) 860 typically include many of the elements described relative to data processing system 800. Remote computer(s) 860 may be logically connected to data processing system 800 through a network interface 862 which is connected to data processing system 800 via communications unit 810. Network interface 862 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 830 may include an encoder, a decoder, or both, comprising hardware, software, or a combination of hardware and software. Codec 830 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 830 is depicted as a separate component, codec 830 may be contained or implemented in memory, e.g., non-volatile memory 842.

Non-volatile memory 842 may include read only memory (ROM), programmable ROM (PROM), electrically programmable ROM (EPROM), electrically erasable programmable ROM (EEPROM), flash memory, and/or the like, or any combination of these. Volatile memory 840 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 816, which are in communication with processor unit 804 through system bus 802. In these illustrative examples, the instructions are in a functional form in persistent storage 808. These instructions may be loaded into memory 806 for execution by processor unit 804. Processes of one or more embodiments of the present disclosure may be performed by processor unit 804 using computer-implemented instructions, which may be located in a memory, such as memory 806.

These instructions are referred to as program instructions, program code, computer usable program code, or computer-readable program code executed by a processor in processor unit 804. The program code in the different embodiments may be embodied on different physical or computer-readable storage media, such as memory 806 or persistent storage 808. Program code 818 may be located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may comprise computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a non-transitory, physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is media that can be touched by a person.

Alternatively, program code 818 may be transferred to data processing system 800, e.g., remotely over a network, using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The computer providing program code 818 may be a server computer, a client computer, or some other device capable of storing and transmitting program code 818.

In some examples, program code 18 may comprise be an operating system (OS) 850. Operating system 850, which may be stored on persistent storage 808, controls and allocates resources of data processing system 800. One or more applications 852 take advantage of the operating system's management of resources via program modules 854, and program data 856 stored on storage devices 816. OS 850 may include any suitable software system configured to manage and expose hardware resources of computer 800 for sharing and use by applications 852. In some examples, OS 850 provides application programming interfaces (APIs) that facilitate connection of different type of hardware and/or provide applications 852 access to hardware and OS services. In some examples, certain applications 852 may provide further services for use by other applications 852, e.g., as is the case with so-called "middleware." Aspects of present disclosure may be implemented with respect to various operating systems or combinations of operating systems.

The different components illustrated for data processing system 800 are not meant to provide architectural limitations to the manner in which different embodiments may be implemented. One or more embodiments of the present disclosure may be implemented in a data processing system that includes fewer components or includes components in addition to and/or in place of those illustrated for computer 800. Other components shown in FIG. 11 can be varied from the examples depicted. Different embodiments may be implemented using any hardware device or system capable of running program code. As one example, data processing system 800 may include organic components integrated with inorganic components and/or may be comprised entirely of organic components (excluding a human being). For example, a storage device may be comprised of an organic semiconductor.

In some examples, processor unit 804 may take the form of a hardware unit having hardware circuits that are specifically manufactured or configured for a particular use, or to produce a particular outcome or progress. This type of hardware may perform operations without needing program code 818 to be loaded into a memory from a storage device to be configured to perform the operations. For example, processor unit 804 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 818) may be implemented as hardware, e.g., by specifying an FPGA configuration using a hardware description language (HDL) and then using a resulting binary file to (re)configure the FPGA.

In another example, data processing system 800 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, system bus 802 may comprise one or more buses, such as a system bus or an input/output bus. Of course, the bus system may be implemented using any suitable type of architecture that provides for a transfer of data between different components or devices attached to the bus system. System bus 802 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in system bus 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

D. Illustrative Programmable Logic Controller

Figure 12:
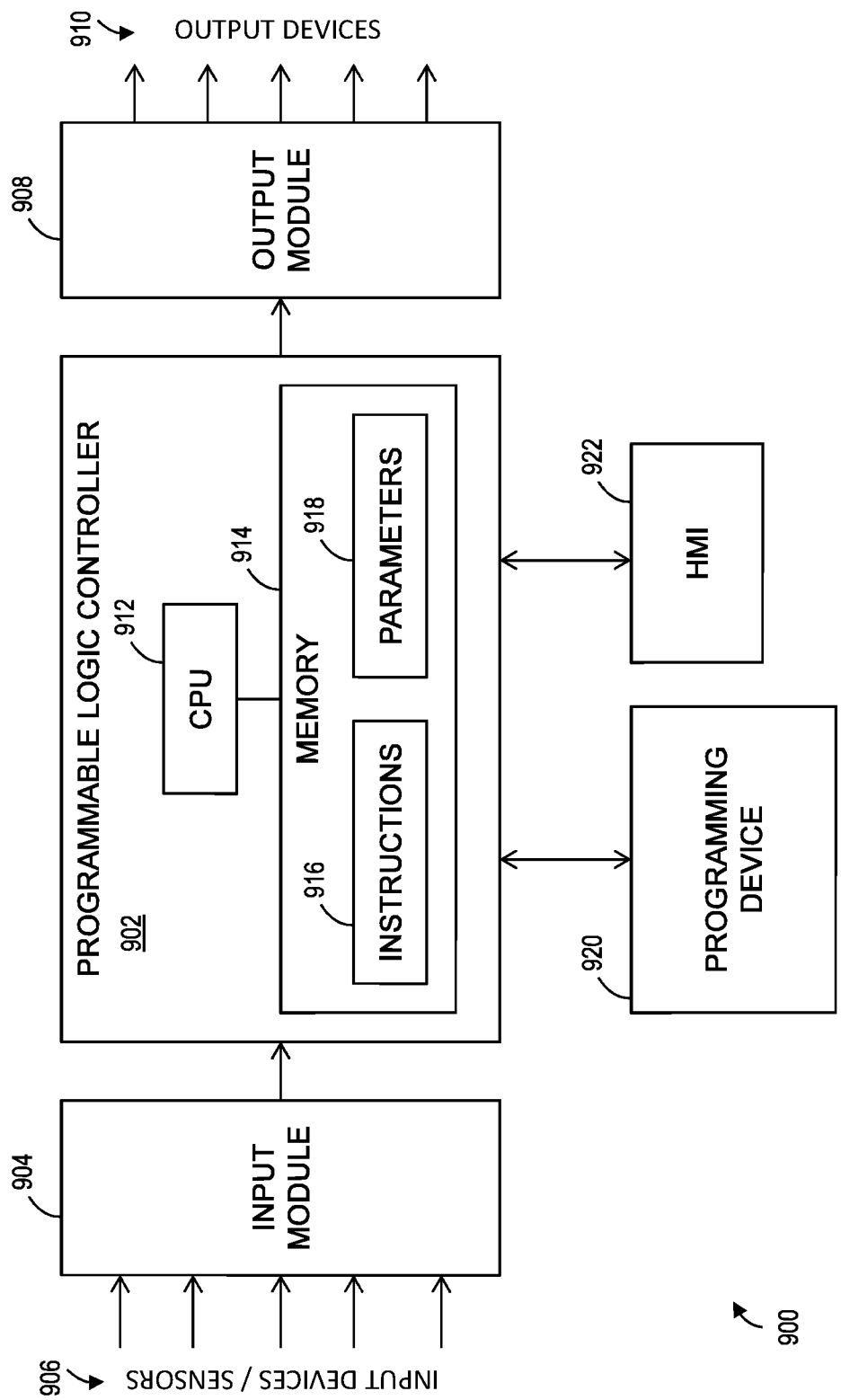
FIG. 12 is a schematic diagram of an illustrative programmable logic controller suitable for use with refrigeration control systems in accordance with aspects of the present disclosure.

As shown in FIG. 12, this section describes an illustrative programmable logic controller system 900 (also referred to as a PLC system) suitable for implementing aspects of DC refrigeration system controls in accordance with aspects of the present disclosure. PLC system 900 is a programmable controller used for automation of typical industrial processes, and is an embodiment of data processing system 800, described above. In some examples, devices that are embodiments of a programmable logic controller system may be included in control systems 110 and 236 (e.g., PLC 238), which may be used to carry out steps of one or more methods described with respect to FIGS. 7-10.

In this illustrative example, PLC system 900 includes a programmable logic controller (PLC) 902, also referred to as a controller. PLC 902 includes a central processing unit (CPU) 912, and a memory 914 for storing instructions 916 and parameters 918 necessary to carry out the relevant automation tasks.

Central processing unit 912 is an example of processor unit 804, described above, and serves to execute software programs in the form of instructions 916. The software programs may be loaded into memory 914. Memory 914, which is an example of storage device 816 described above, may also store parameters 918 needed for operation. A programming device 920 may interface with PLC 902 to facilitate the input of instructions and settings and/or to monitor equipment operation. Programming device 920 may include, for example, a handheld computer or personal computer.

A human machine interface (HMI) 922 may also be placed in communication with PLC 902. HMI 922 facilitates a user-friendly and interactive interface with the system processes and controls. Human machine interface 922 may also assist an operator in determining machine conditions, in changing machine settings, and/or displaying faults.

PLC system 900 includes an input module 904 in receiving communication with one or more input devices/sensors 906, and an output module 908 in outgoing communication with one or more output devices 910. Both modules 904 and 908 are hardware devices in communication with PLC 902. In some examples, communication with PLC 902 may be carried out via an optical (or otherwise wireless) interface, such that PLC 902 is electrically isolated from the input and output modules.

Input module 904 may convert analog signals from input devices/sensors 906 into digital and/or logic signals that the PLC can use. Signal types may be digital or analog. With these signals the CPU may evaluate the status of the inputs. Upon evaluating the input(s), along with known output states and stored program parameters and instructions, the CPU may execute one or more predetermined commands to control the one or more output devices. Output module 908 may convert control signals from the CPU into digital or analog signals which may be used to control the various output devices.

HMI 922 and programming device 920 may provide for communications with other data processing systems or devices, e.g., through the use of physical and/or wireless communications links.

Modules 904 and 908 allow for input and output of data with other devices that may be connected to PLC 902. For example, input module 904 may provide a connection for temperature or pressure measurements, valve or machine status, tank level status, user input through a keyboard, a mouse, and/or any other suitable input device. Output module 908 may send output to an actuator, indicator, motor controller, printer, machine, display, and/or any other suitable output device.

E. Illustrative Distributed Data Processing System

Figure 13:
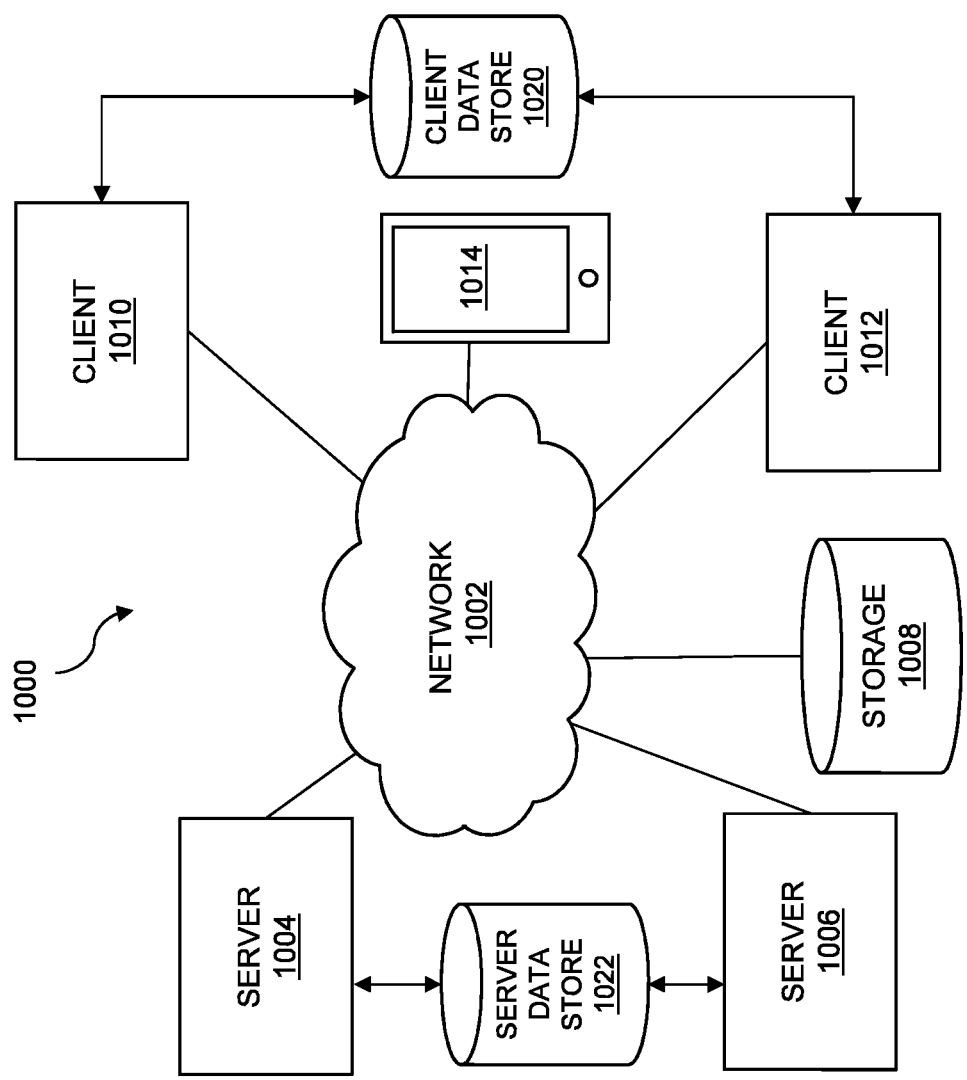
FIG. 13 is a schematic diagram of a distributed data processing system suitable for use with refrigeration control systems in accordance with aspects of the present disclosure.

As shown in FIG. 13, this example describes a general network data processing system 1000, interchangeably termed a network, a computer network, a network system, a distributed data processing system, or a distributed network, aspects of which may be included in one or more illustrative embodiments of the control systems described herein. For example, control, operation, and/or monitoring of a refrigeration system may be performed remotely, over a network.

It should be appreciated that FIG. 13 is provided as an illustration of one implementation and is not intended to imply any limitation with regard to environments in which different embodiments may be implemented. Many modifications to the depicted environment may be made.

Network system 1000 is a network of devices (e.g., computers), each of which may be an example of data processing system 800, and other components. Network data processing system 1000 may include network 1002, which is a medium configured to provide communications links between various devices and computers connected within network data processing system 1000. Network 1002 may include connections such as wired or wireless communication links, fiber optic cables, and/or any other suitable medium for transmitting and/or communicating data between network devices, or any combination thereof.

In the depicted example, a first network device 1004 and a second network device 1006 connect to network 1002, as do one or more computer-readable memories or storage devices 1008. Network devices 1004 and 1006 are each examples of data processing system 800, described above. In the depicted example, devices 1004 and 1006 are shown as server computers, which are in communication with one or more server data store(s) 1022 that may be employed to store information local to server computers 1004 and 1006, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 1010 and 1012 and/or a client smart device 1014, may connect to network 1002. Each of these devices is an example of data processing system 800, described above regarding FIG. 11. Client electronic devices 1010, 1012, and 1014 may include, for example, one or more personal computers, network computers, and/or mobile computing devices such as personal digital assistants (PDAs), smart phones, handheld gaming devices, wearable devices, and/or tablet computers, and the like. In the depicted example, server 1004 provides information, such as boot files, operating system images, and applications to one or more of client electronic devices 1010, 1012, and 1014. Client electronic devices 1010, 1012, and 1014 may be referred to as "clients" in the context of their relationship to a server such as server computer 1004. Client devices may be in communication with one or more client data store(s) 1020, which may be employed to store information local to the clients (e,g., cookie(s) and/or associated contextual information). Network data processing system 1000 may include more or fewer servers and/or clients (or no servers or clients), as well as other devices not shown.

In some examples, first client electric device 1010 may transfer an encoded file to server 1004. Server 1004 can store the file, decode the file, and/or transmit the file to second client electric device 1012. In some examples, first client electric device 1010 may transfer an uncompressed file to server 1004 and server 1004 may compress the file. In some examples, server 1004 may encode text, audio, and/or video information, and transmit the information via network 1002 to one or more clients.

Client smart device 1014 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 1000 may be stored in or on a computer-readable storage medium, such as network-connected storage device 1008 and/or a persistent storage 808 of one of the network computers, as described above, and may be downloaded to a data processing system or other device for use. For example, program code may be stored on a computer-readable storage medium on server computer 1004 and downloaded to client 1010 over network 1002, for use on client 1010. In some examples, client data store 1020 and server data store 1022 reside on one or more storage devices 1008 and/or 808.

Network data processing system 1000 may be implemented as one or more of different types of networks. For example, system 1000 may include an intranet, a local area network (LAN), a wide area network (WAN), or a personal area network (PAN). In some examples, network data processing system 1000 includes the Internet, with network 1002 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 1002 may be referred to as a "cloud." In those examples, each server 1004 may be referred to as a cloud computing node, and client electronic devices may be referred to as cloud consumers, or the like. FIG. 13 is intended as an example, and not as an architectural limitation for any illustrative embodiments.

F. Additional Examples and Illustrative Combinations

This section describes additional aspects and features of DC refrigeration systems and related controls, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A refrigeration control system comprising:
one or more processors;
a memory comprising one or more storage devices; and
a control program including a plurality of instructions stored in the memory and executable by the one or more processors to:
determine when DC power is provided to a refrigeration system by a photovoltaic (PV) source;
when DC power is provided by the PV source, maximize power consumption by the refrigeration system by causing continuous operation of one or more electrical motors of the refrigeration system, such that cooling of a chamber of the refrigeration system is limited only by a refrigerant capacity of the refrigeration system; and
when DC power is provided by a non-PV source, manage power consumption by cycling the one or motors to maintain a temperature range in the chamber.

A1. The system of A0, further comprising a mass disposed in the chamber, wherein causing continuous operation of the one or more electrical motors of the refrigeration system causes the mass to be subcooled.

A2. The system of A1, wherein the mass comprises a solid.

A3. The system of A1, wherein the mass comprises a liquid.

A4. The system of any one of paragraphs A0 through A3, wherein cooling of the chamber continues below a freezing temperature.

A5. The system of any one of paragraphs A0 through A4, wherein the plurality of instructions are further executed by the one or more processors to adjust a speed of the one or more motors of the refrigeration system.

A6. The system of A5, wherein the speed is adjusted to maximize power consumption when using PV power and adjusted to minimize a rate of temperature change when using non-PV power.

A7. The system of any one of paragraphs A0 through A6, wherein determining when the refrigeration system is powered by the PV source comprises determining that a DC bus voltage of the refrigeration system is above a selected threshold.

B0. A refrigeration system comprising:
a chamber;
a refrigeration circuit coupled to the chamber and configured to remove heat from the chamber;
a plurality of electrical power sources selectably coupled to the refrigeration circuit, including at least one photovoltaic (PV) source and at least one non-PV source; and
a control system configured to automatically operate the refrigeration circuit using electrical power from a selected one of the plurality of electrical power sources;
wherein the control system is operable in a first mode, in which the refrigeration circuit runs continuously in response to being powered by the at least one PV source, and a second mode, in which the refrigeration circuit cycles to maintain a temperature range.

B1. The system of B0, the chamber containing a mass that is cooled by the refrigeration circuit.

B2. The system of B1, wherein the mass comprises a liquid.

B3. The system of B1, wherein the mass is subcooled when the control system is in the first mode.

B4. The system of B3, wherein the mass is subcooled below a freezing point.

B5. The system of B3, wherein cooling of the mass is limited only by a refrigerant capacity of the refrigeration circuit.

B6. The system of any one of paragraphs B0 through B5, wherein the refrigeration circuit cycles on and off when in the second mode.

B7. The system of any one of paragraphs B0 through B6, wherein the control system automatically enters the second mode when the at least one non-PV source is coupled to the refrigeration circuit.

B8. The system of any one of paragraphs B0 through B7, wherein one of the electrical power sources is selectably coupled to the refrigeration circuit based on a voltage threshold.

B9. The system of B8, wherein one of the one or more PV sources is automatically coupled to the system when voltage supplied by the PV source is above the voltage threshold.

B10. The system of any one of paragraphs B0 through B9, wherein the refrigeration circuit is modular.

B11. The system of any one of paragraphs B0 through B10, wherein the one or more non-PV sources comprises a generator.

B12. The system of B11, wherein the generator is a diesel-powered DC generator.

B13. The system of any one of paragraphs B0 through B12, wherein the one or more non-PV sources comprises an alternating current (AC) source coupled to an AC to DC converter.

C0. A refrigeration method comprising:
cooling a space using a direct current (DC)-powered refrigeration system;
automatically changing between sources of DC power to the refrigeration system based on availability of power, the sources of DC power comprising a photovoltaic (PV) source and a non-PV source;
using a controller of the refrigeration system, automatically maximizing power usage by running the refrigeration system continuously when using the PV source of DC power;
using the controller, automatically managing power usage by cycling the refrigeration system based on a temperature of the space when using the non-PV source of DC power.

C1. The method of C0, wherein the temperature comprises a temperature range.

C2. The method of any one of paragraphs C0 through C1, wherein the non-PV source of DC power comprises a generator.

C3. The method of any one of paragraphs C0 through C2, wherein the non-PV source of DC power comprises an alternating current (AC) source coupled to an AC to DC converter.

C4. The method of any one of paragraphs C0 through C3, wherein automatically maximizing power usage by running the refrigeration system continuously includes causing a mass in the space to be subcooled.

C5. The method of C4, wherein the mass is subcooled below a freezing point.

C6. The method of C4, further comprising:
using the subcooled mass as a heat sink when automatically managing power usage by cycling the refrigeration system based on the temperature of the space.

C7. The method of any one of paragraphs C0 through C6, further comprising:
biasing the system to select the PV source whenever the PV source is available.

C8. The method of any one of paragraphs C0 through C7, wherein automatically managing power usage comprises adjusting a speed of one or more motors of the refrigeration system to (a) maintain the temperature of the space substantially within a selected temperature range, and (b) minimize a rate of change of the temperature.

D0. A refrigeration control system comprising:
one or more processors;
a memory comprising one or more storage devices; and
a control program including a plurality of instructions stored in the memory and executable by the one or more processors to:
monitor a first voltage of a DC power bus powering a plurality of refrigeration system devices and a second voltage of an output of a photovoltaic (PV) source, the DC power bus powered by the photovoltaic source through a first voltage controller;
in response to the first voltage falling below a selected threshold, powering the DC power bus using an AC source configured to provide DC power through an AC to DC converter and a second voltage controller, wherein an output voltage of the converter is controlled by the voltage controller to be less than or equal to the threshold; and in response to the second voltage rising above the threshold, transfer power from the AC source to the photovoltaic source.

E0. A data processing system for controlling a refrigeration system, the data processing system comprising:
a processor;
a memory; and
a control program including a plurality of instructions stored in the memory and executable by the processor to:
monitor a temperature of a refrigerated chamber in a refrigeration system as a function of time;
compare the temperature to a selected temperature range; and
adjust a speed of one or more motors of the refrigeration system to (a) maintain the temperature substantially within the selected temperature range, and (b) minimize a rate of change of the temperature.

F0. In some examples, a control system may include an off-the-shelf PLC-based system that is powered by 12, 24, 36 or 48 VDC. In some examples, a suitable microcontroller may be used that is built from available components and operated with open source code. Controls may be operated with a local LED Human Machine Interface (HMI).

G0. In some examples, a control system may include a "remote view" and/or "remote operation" feature, e.g., using an industrial cellular gateway. Run data may be uploaded to a cloud server on a routine basis to provide operational and performance analysis. Communications may be two-way, enabling, for example, setpoint modification, mode selection, and software updates. Remote view and operation may be available via web connected computer and/or smart phone.

H0. In some examples, a control system may include one or more Bluetooth® temperature sensor "pucks," which may provide the option of selecting the specific location(s) of temperature control and/or temperature monitoring.

Advantages, Features, Benefits

The different embodiments and examples of the control systems described herein provide several advantages over known solutions. For example, illustrative embodiments and examples described herein eliminate the need for an inverter. Known systems convert the DC power from PV panels to AC power using an inverter, which consumes 7-10% of the available power. This requires extra solar panels and added cost to provide for this wasteful load. It also eliminates an equipment (inverter) cost of about 25% of the entire system.

Additionally, and among other benefits, illustrative embodiments and examples described herein are able to provide commercial scale refrigeration/freezing without an AC grid connection. Known commercial systems require an AC grid connection.

Additionally, and among other benefits, illustrative embodiments and examples described herein provides some PV-powered cooling even in low light conditions.

Additionally, and among other benefits, illustrative embodiments and examples described herein allow easy monitoring and remote tuning for operating under location-specific conditions.

Additionally, and among other benefits, illustrative embodiments and examples described herein have a design and form factor that allows the unit to be readily applied to multiple use cases (e.g., shipping container, over the road refrigerated container/truck, or owner supplied cold room/box).

Additionally, and among other benefits, illustrative embodiments and examples described herein can be applied to any DC-powered system that uses multiple power supplies and has one or more DC loads (e.g., motors and heaters). For example, a PV powered distillation unit, water purifier, oil/water separator, remote pumping station, etc.

Additionally, and among other benefits, illustrative embodiments and examples described herein may be modified to work with a roof-mounted PV system on a home or business that has converted some of the building's power load to DC (e.g., HVAC, refrigeration, water heater, lighting).

Additionally, and among other benefits, illustrative embodiments and examples described herein may be used to automatically consume minimum power when not drawing from a PV power source, and to automatically consume all available power when on a PV power source.

Additionally, and among other benefits, illustrative embodiments and examples described herein may be used in a PV-power only system, such that power consumption is automatically maximized during PV power availability, resulting in subcooled mass. Cold storage is then maintained during the intermittent periods when PV power is unavailable by the cold reserve created by the subcooled mass. In some cases, battery back-up may also be used during times of insufficient PV power.

No known system or device can perform these functions, particularly with DC powered refrigeration systems. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A control system, comprising:
one or more processors;
a memory comprising one or more storage devices; and
a control program including a plurality of instructions stored in the memory and executable by the one or more processors to:
compare a direct current (DC) bus voltage of a DC power bus of an electrical system to a selected threshold, wherein the DC power bus is continuously electrically connected to a photovoltaic (PV) DC source and a non-PV DC source, such that the DC bus voltage is automatically supplied by whichever DC source has a higher output voltage;

in response to the DC bus voltage being greater than the threshold, determine that DC power is provided to the electrical system by the PV source, and automatically transition the electrical system to (or maintain the electrical system in) a first mode, in which power consumption is maximized by causing continuous operation of one or more electrical loads of the electrical system; and in response to the DC bus voltage being lower than the threshold, determine that DC power is provided by the non-PV source, and automatically transition the electrical system to (or maintain the electrical system in) a second mode, in which power consumption is managed by cycling the one or electrical loads.

2. The system of claim 1, wherein the one or more electrical loads include at least one motor.

3. The system of claim 2, wherein the plurality of instructions are further executed by the one or more processors to adjust a speed of the at least one motor.

4. The system of claim 3, wherein the speed is adjusted to maximize power consumption when using PV power.

5. The system of claim 1, wherein the electrical system comprises a refrigeration system configured to cool a mass disposed in a chamber.

6. The system of claim 1, further comprising a storage battery continuously connected to the DC power bus; wherein the control system is further configured to automatically operate the electrical load using electrical power from the storage battery in response to a loss of both the PV and non-PV sources.

7. The system of claim 6, wherein the storage battery is configured to be charged by the PV source.

8. The system of claim 1, further comprising a delay timer configured to prevent the control system from automatically switching between the first and second modes until a selected delay time has passed.

9. An electrical system, comprising:
an electrical load;
a plurality of electrical power sources coupled to the electrical load, including at least one photovoltaic (PV) source and at least one non-PV source; and
a control system configured to compare a direct current (DC) bus voltage of a DC power bus of the electrical system to a selected threshold, wherein the DC power bus is continuously electrically connected to the PV source and the non-PV source, such that the DC bus voltage is automatically supplied by whichever DC source has a higher output voltage;
and automatically operate the electrical load using electrical power from whichever DC source has a higher output voltage;
wherein the control system is operable in a first mode, in which the electrical load is caused to run continuously in response to the DC bus voltage being greater than the threshold, and a second mode, in which the electrical load is caused to cycle on an as-needed basis in response to the DC bus voltage being lower than the threshold.

10. The system of claim 9, wherein the electrical load comprises a refrigeration circuit configured to cycle on and off when in the second mode.

11. The system of claim 9, wherein the control system automatically enters the second mode when the at least one non-PV source is coupled to the electrical load.

12. The system of claim 9, wherein one of the electrical power sources is selectively coupled to the electrical load based on a voltage threshold.

13. The system of claim 12, wherein one of the PV sources is automatically coupled to the electrical load when voltage supplied by the PV source is above the voltage threshold.

14. The system of claim 9, further comprising a storage battery continuously connected to the DC power bus; wherein the control system is further configured to automatically operate the electrical load using electrical power from the battery in response to a loss of both the PV and non-PV sources.

15. The system of claim 14, wherein the storage battery is configured to be charged by the PV source.

16. The system of claim 9, further comprising a delay timer configured to prevent the control system from automatically switching between the first and second modes until a selected delay time has passed.

17. A method for controlling an electrical system, the method comprising:
comparing a DC bus voltage of a DC power bus of an electrical system to a selected threshold, wherein the DC power bus is continuously electrically connected to a plurality of DC sources comprising a photovoltaic (PV) DC source and a non-PV DC source, such that the DC bus voltage is automatically supplied by whichever of the DC sources has a higher output voltage;
automatically changing to whichever of the DC sources has a higher output voltage;
using a controller of the electrical system, automatically maximizing power usage by running the electrical system continuously in response to the DC bus voltage being greater than the threshold; and
using the controller, automatically managing power usage by cycling the electrical system in response to the DC bus voltage being lower than the threshold.

18. The method of claim 17, further comprising:
biasing the system to select the PV source whenever the PV source is available.

19. The method of claim 17, wherein automatically managing power usage comprises adjusting a speed of one or more motors of the electrical system.

20. The method of claim 17, wherein the non-PV DC source comprises an output of an AC to DC converter.

* * * * *